(12) United States Patent
Nagase (10) Patent No.: US 11,654,722 B2
(45) Date of Patent: May 23, 2023

(54) TIRE (71) Applicant: Sumitomo Rubber Industries, Ltd., Kobe (JP)

(72) Inventor: Hiroki Nagase, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 226 days.

(21) Appl. No.: 17/066,513

(22) Filed: Oct. 9, 2020

(65) Prior Publication Data

US 2021/0107317 A1    Apr. 15, 2021

(30) Foreign Application Priority Data

Oct. 11, 2019   (JP) .............................. JP2019-187991

(51) Int. Cl.
*B60C 11/03* (2006.01)
*B60C 9/00* (2006.01)
*B60C 11/00* (2006.01)

(52) U.S. Cl.
CPC ........ *B60C 11/0302* (2013.01); *B60C 9/0007* (2013.01); *B60C 11/0083* (2013.01);
(Continued)

(58) Field of Classification Search
CPC ............... B60C 11/0302; B60C 9/0007; B60C 11/0083; B60C 2011/0346; B60C 2011/0372; B60C 11/04; B60C 11/12; B60C 11/03; B60C 11/1259; B60C 11/0332
See application file for complete search history.

(56) References Cited

U.S. PATENT DOCUMENTS 3,115,919 A    12/1963   Roberts
5,957,179 A     9/1999   Graas
(Continued)

FOREIGN PATENT DOCUMENTS

EP    0 841 198 A1    5/1998
EP    1 481 822 A1   12/2004
(Continued)

OTHER PUBLICATIONS

Extended European Search Report dated Mar. 30, 2021 in European Patent Application No. 20198578.5, 21 pages.
(Continued)

*Primary Examiner* — Galen H Hauth
*Assistant Examiner* — Shibin Liang
(74) *Attorney, Agent, or Firm* — Xsensus LLP (57) ABSTRACT

Provided is a tire including a tread portion. The tread portion includes two circumferential grooves and three land portions. The three land portions include a crown land portion disposed on a tire equator, and two shoulder land portions including tread contact ends. At least one of the shoulder land portions includes a plurality of main inclined grooves and a plurality of subsidiary inclined grooves. The main inclined grooves have tire-axially inner ends ending in the shoulder land portions and tire-axially outer ends disposed outwardly of the tread contact ends Te in the tire axial direction. The subsidiary inclined grooves have tire-axially inner ends ending in the shoulder land portions and tire-axially outer ends ending in the shoulder land portions.

19 Claims, 7 Drawing Sheets

(52) U.S. Cl.
CPC ............. *B60C 2011/0346* (2013.01); *B60C 2011/0372* (2013.01)

(56) References Cited

U.S. PATENT DOCUMENTS

| | | | |
|---|---|---|---|
| 10,023,012 B2 * | 7/2018 | Hayashi | B60C 11/1323 |
| 2009/0114333 A1 * | 5/2009 | Maus | B60C 15/06 |
| | | | 152/541 |
| 2013/0220499 A1 * | 8/2013 | Sanae | B60C 11/1323 |
| | | | 152/209.18 |
| 2013/0220500 A1 * | 8/2013 | Okabe | B60C 1/0016 |
| | | | 152/209.1 |
| 2016/0250897 A1 * | 9/2016 | Fujioka | B60C 11/0306 |
| | | | 152/209.23 |

FOREIGN PATENT DOCUMENTS

| | | | |
|---|---|---|---|
| EP | 3 095 620 A1 | 11/2016 | |
| EP | 3 231 638 A1 | 10/2017 | |
| EP | 3 323 638 A1 | 5/2018 | |
| EP | 3 456 551 A1 | 3/2019 | |
| JP | 62289405 | * 12/1987 | ............ B60C 11/04 |
| JP | 2005-319890 A | 11/2005 | |
| JP | 2013-173394 A | 9/2013 | |

OTHER PUBLICATIONS

Partial European Search Report dated Feb. 10, 2021 in European Patent Application No. 20198578.5, 19 pages.

* cited by examiner

TIRE

CROSS REFERENCE TO RELATED APPLICATION

The present application claims priority to Japanese patent application JP 2019-187991, filed on Oct. 11, 2019, the entire contents of which is incorporated herein by reference in its entirety.

BACKGROUND

Technical Field

The present disclosure relates to a tire.

Description of the Background Art

Japanese Laid-Open Patent Publication No. 2013-173394 suggests a tire that has improved disposition of grooves, and thus allows steering stability to be improved while ensuring wet performance.

In recent years, tires are required to provide more excellent steering stability according to enhancement of performance of vehicles. Meanwhile, enhancement of steering stability may degrade wet performance depending on disposition of grooves in some cases.

The present disclosure has been made in view of the aforementioned and other problems, and an aspect of the present disclosure is to provide a tire that allows excellent steering stability to be exhibited while maintaining wet performance.

SUMMARY

The present disclosure is directed to a tire including a tread portion. The tread portion includes two circumferential grooves continuously extending in a tire circumferential direction on both sides lateral to a tire equator so as to zigzag, and three land portions demarcated by the two circumferential grooves. The three land portions include a crown land portion disposed on the tire equator, and two shoulder land portions including tread contact ends. At least one of the shoulder land portions includes a plurality of main inclined grooves extending so as to be inclined relative to a tire axial direction, and a plurality of subsidiary inclined grooves extending so as to be inclined relative to the tire axial direction. The main inclined grooves have tire-axially inner ends ending in the shoulder land portions and tire-axially outer ends disposed outwardly of the tread contact ends in the tire axial direction. The subsidiary inclined grooves have tire-axially inner ends ending in the shoulder land portions and tire-axially outer ends ending in the shoulder land portions.

DESCRIPTION OF THE EMBODIMENTS

Embodiments of the present disclosure will be described below with reference to the drawings.

Figure 1:
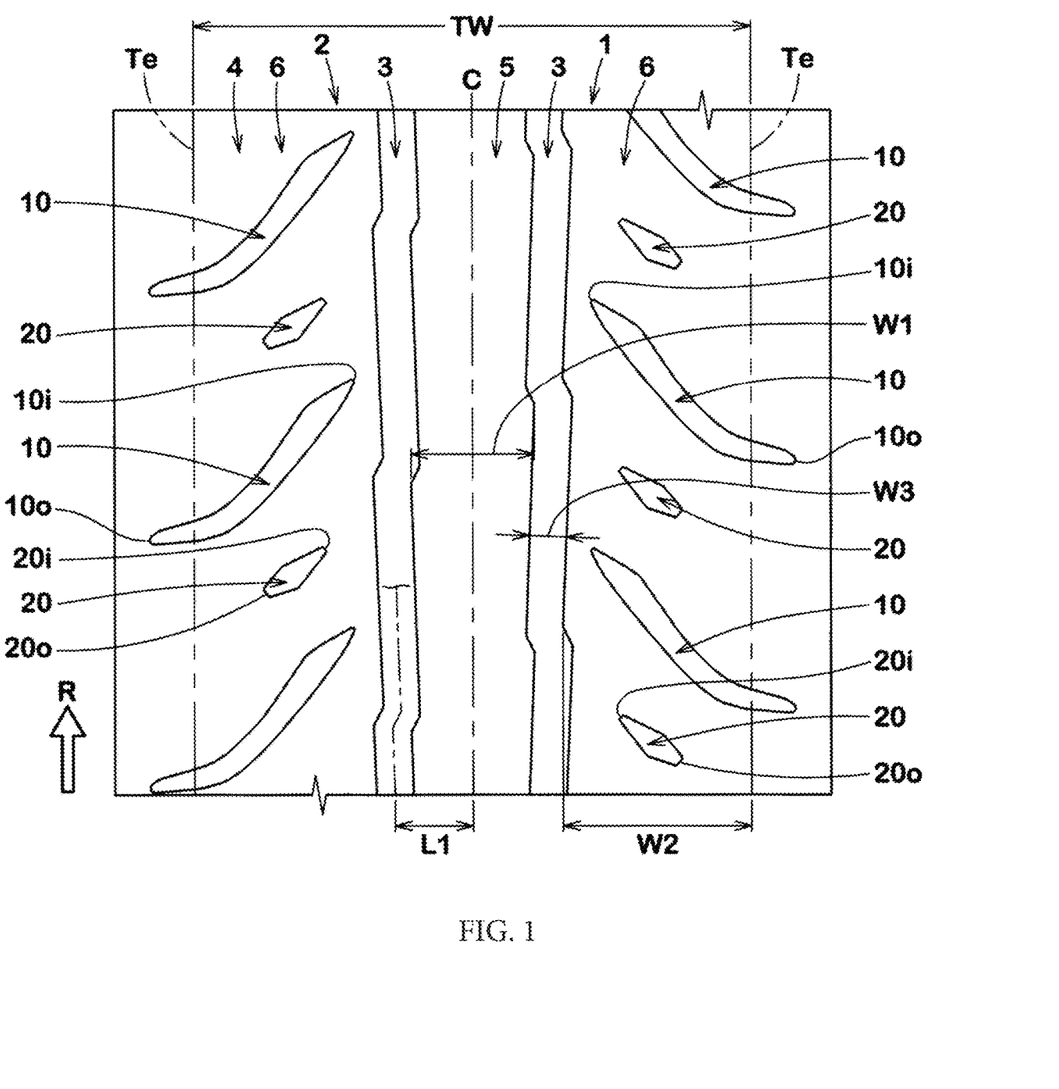
FIG. 1 is a development of a tread portion of a tire according to one embodiment of the present disclosure.

FIG. 1 is a development of a tread portion 2 of a tire 1 according to one embodiment of the present disclosure. The tire 1 of the present embodiment is, for example, a pneumatic tire for a passenger car, and is also a high-performance tire specific to running on a circuit. However, the present disclosure is not limited thereto. The tire of the present embodiment may be, for example, a tire for running on a public road, or a sport tire designed mainly for performance on a circuit while also suitable for running on a public road.

The tire 1 of the present embodiment has, for example, a directional pattern having a designated rotational direction R. The rotational direction R is indicated by, for example, a character or a symbol on a sidewall portion (not shown).

The tread portion 2 of the tire 1 has two circumferential grooves 3 continuously extending in the tire circumferential direction on both sides lateral to a tire equator C so as to zigzag, and three land portions 4 demarcated by the two circumferential grooves 3. The two circumferential grooves 3 exhibit excellent drainage performance near the tire equator C. The zigzag circumferential grooves 3 have edges that allow traction to be enhanced during straight running.

The three land portions 4 include a crown land portion 5 disposed on the tire equator C and two shoulder land portions 6 including tread contact ends Te.

The tread contact end Te is the outermost contact position in the tire axial direction when the tire 1 in a normal state is in contact with a plane at a camber angle of 0° under a normal load, in the case of the tire 1 being a pneumatic tire.

The normal state represents a state where the tire 1 is mounted on a normal rim and is inflated to a normal internal pressure, and no load is applied to the tire 1. In the description herein, unless otherwise specified, the dimensions and the like of each component of the tire are indicated as values measured in the normal state.

The "normal rim" represents a rim that is defined by a standard, in a standard system including the standard with which the tire complies, for each tire, and is, for example, the "standard rim" in the JATMA standard, the "Design Rim" in the TRA standard, or the "Measuring Rim" in the ETRTO standard.

The "normal internal pressure" represents an air pressure that is defined by a standard, in a standard system including the standard with which the tire complies, for each tire, and is the "maximum air pressure" in the JATMA standard, the maximum value recited in the table "TIRE LOAD LIMITS AT VARIOUS COLD INFLATION PRESSURES" in the TRA standard, or the "INFLATION PRESSURE" in the ETRTO standard.

The "normal load" represents a load that is defined by a standard, in a standard system including the standard with which the tire complies, for each tire, and is the "maximum load capacity" in the JATMA standard, the maximum value recited in the table "TIRE LOAD LIMITS AT VARIOUS COLD INFLATION PRESSURES" in the TRA standard, or the "LOAD CAPACITY" in the ETRTO standard.

At least one of the shoulder land portions 6 includes a plurality of main inclined grooves 10 and a plurality of subsidiary inclined grooves 20 each extending so as to be inclined relative to the tire axial direction. In the present embodiment, both the two shoulder land portions 6 each include the main inclined grooves 10 and the subsidiary inclined grooves 20.

Each main inclined groove 10 has a tire-axially inner end 10i ending in the shoulder land portion 6, and a tire-axially outer end 10o disposed outwardly of the tread contact end Te in the tire axial direction. The main inclined groove 10 having the inner end 10i maintains stiffness near the circumferential groove 3 and enhances steering stability. The main inclined groove 10 can guide water therein outwardly of the tread contact end Te during running on a wet road surface and contributes to enhancement of wet performance.

Each subsidiary inclined groove 20 has a tire-axially inner end 20i and a tire-axially outer end 20o each ending in the shoulder land portion 6. The subsidiary inclined groove 20 having such a structure can help the main inclined groove 10 in enhancing drainage performance while maintaining stiffness of the shoulder land portion 6.

Each structure of the present embodiment will be described below in detail. A distance L1 in the tire axial direction from the tire equator C to a groove center line of the circumferential groove 3 is, for example, 10% to 20% of a tread width TW. Thus, a width W1 of the crown land portion 5 in the tire axial direction is, for example, 20% to 30% of the tread width TW. A width W2 of the shoulder land portion 6 in the tire axial direction is, for example, 30% to 40% of the tread width TW. The width W2 of the shoulder land portion 6 in the tire axial direction is preferably 1.3 to 1.9 times the width W1 of the crown land portion 5 in the tire axial direction. The tread portion 2 having such a structure ensures the width of the crown land portion 5 and allows excellent steering stability to be exhibited. However, the present disclosure is not limited thereto. The tread width TW represents a distance in the tire axial direction from one of the tread contact ends Te to the other of the tread contact ends Te in the normal state.

A groove width W3 of the circumferential groove 3 is, for example, 5.0% to 8.0% of the tread width TW. The groove width W3 of the circumferential groove 3 is, for example, 20% to 40% of the width W1 of the crown land portion 5. The circumferential groove 3 having such a structure contributes to well-balanced enhancement of wet performance and steering stability.

Figure 2:
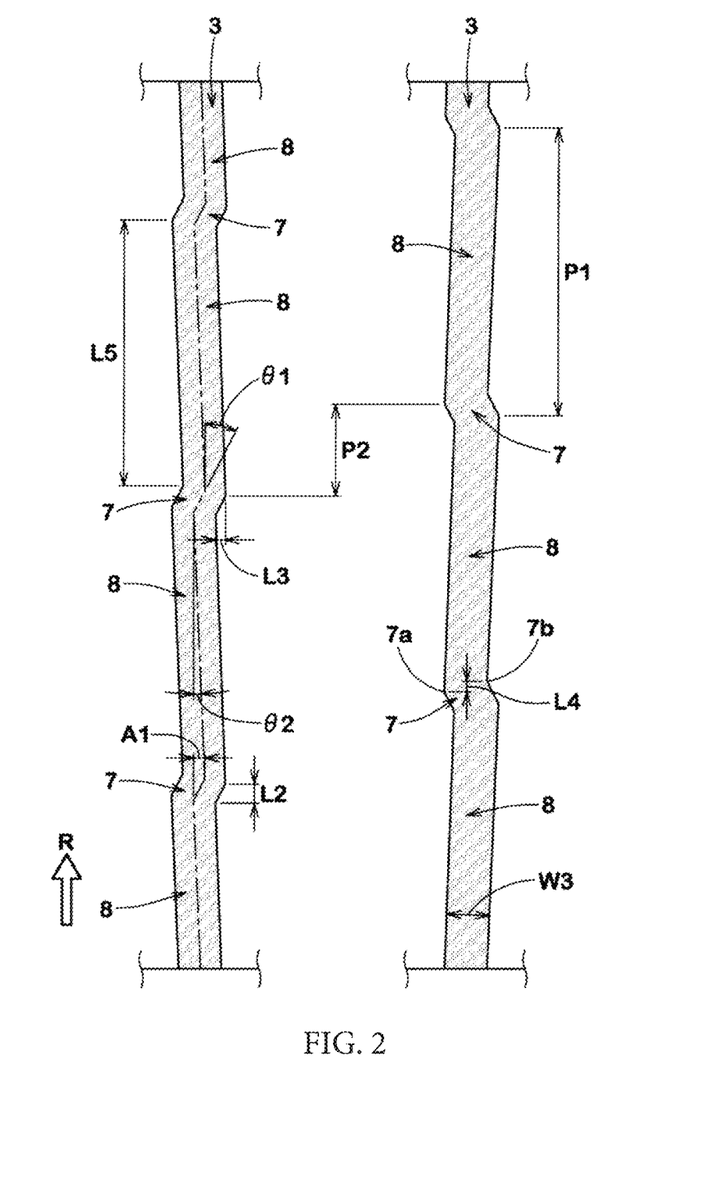
FIG. 2 is an enlarged view of two circumferential grooves shown in FIG. 1.

FIG. 2 is an enlarged view of the two circumferential grooves 3. For easy understanding, in FIG. 2, the circumferential grooves 3 are colored. As shown in FIG. 2, the two circumferential grooves 3 are disposed so as to deviate the zigzag phases from each other in the tire circumferential direction. The two circumferential grooves 3 are line-symmetric about the tire equator C if the zigzags of the two circumferential grooves 3 are in phase with each other. A phase difference P2 between the two circumferential grooves 3 is, for example, 25% to 40% of a zigzag pitch P1 of the circumferential groove 3.

Figure 3A:
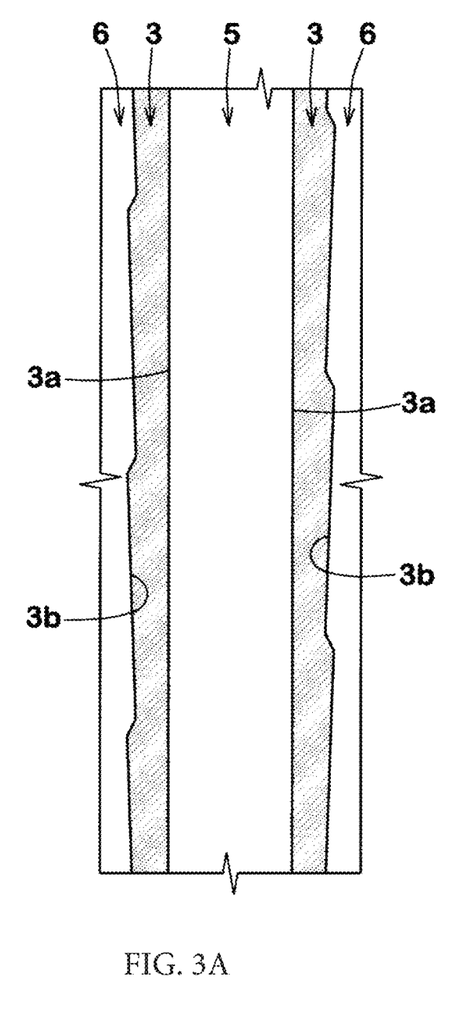
FIG. 3A is an enlarged view of two circumferential grooves according to another embodiment.
Figure 3B:
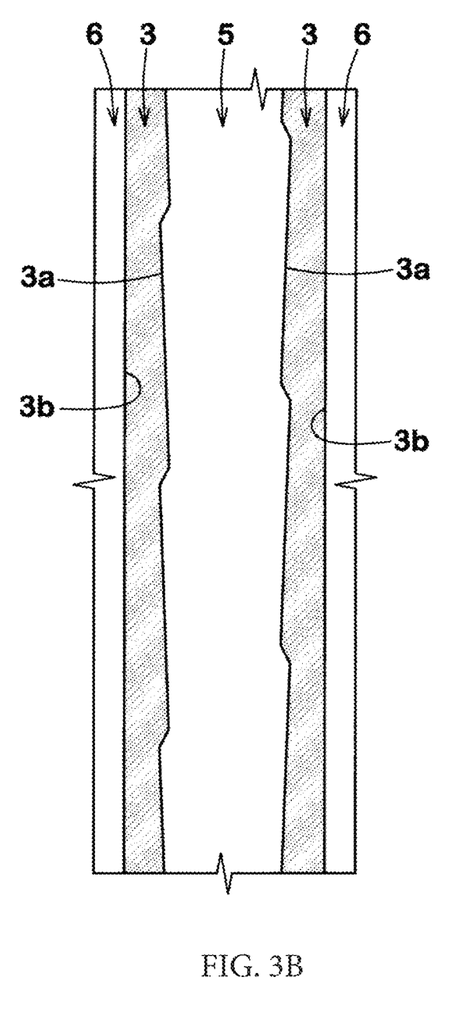
FIG. 3B is an enlarged view of two circumferential grooves according to another embodiment.

In the circumferential groove 3 of the present embodiment, for example, edges on both sides extend in parallel with each other so as to zigzag. However, the circumferential groove 3 of the present disclosure is not limited thereto as long as the groove center line zigzags. Therefore, as in another embodiment shown in FIG. 3A, an edge 3a on the crown land portion 5 side may linearly extend and an edge 3b on the shoulder land portion 6 side may zigzag. Furthermore, as in another embodiment shown in FIG. 3B, the edge 3a on the crown land portion 5 side may zigzag and the edge 3b on the shoulder land portion 6 side may linearly extend.

As shown in FIG. 2, a zigzag amplitude A1 of the groove center line of the circumferential groove 3 in the tire axial direction is preferably less than the groove width W3 of the circumferential groove 3. The zigzag amplitude A1 is, for example, 25% to 40% of the groove width W3 of the circumferential groove 3. The circumferential groove 3 having such a structure can exhibit the above-described effects while maintaining wear resistance.

The circumferential groove 3 includes a first inclined portion 7 and a second inclined portion 8 that is longer than the first inclined portion 7 and is inclined in a direction opposite to a direction of the first inclined portion 7. The first inclined portion 7 and the second inclined portion 8 each include two linearly extending edges. The first inclined portion 7 is inclined, for example, toward the tread contact end Te onto the heel side in the tire rotational direction R. The second inclined portion 8 is inclined, for example, toward the tire equator C onto the heel side in the tire rotational direction R. Thus, during running on a wet road surface, when water in the circumferential groove 3 is drained toward the tire heel side due to rotation of the tire, the water is easily guided toward the tread contact end Te by the first inclined portion 7. Therefore, drainage performance of the circumferential groove 3 can be enhanced by the above-described inclination direction.

A length L2 of the edge of the first inclined portion 7 in the tire circumferential direction is preferably not greater than 10% of the width W1 (shown in FIG. 1, similar in the following description) of the crown land portion 5. The length L2 of the edge of the first inclined portion 7 in the tire circumferential direction is preferably 15% to 30% of the groove width W3 of the circumferential groove 3.

A length L3 of the edge of the first inclined portion 7 in the tire circumferential direction is preferably 1.3 to 3.0 times the length of the edge in the tire axial direction. The first inclined portion 7 having such a structure can enhance traction by means of its edge while the drainage performance of the circumferential groove 3 is maintained.

An intersection point 7a of one of the edges of the first inclined portion 7 and the edge of the second inclined portion 8 and an intersection point 7b of the other of the edges of the first inclined portion 7 and the edge of the second inclined portion 8 are preferably positioned so as to deviate from each other in the tire circumferential direction. A deviation L4 between the intersection points in the tire circumferential direction is, for example, preferably 80% to 150% of the length L2 of the edge of the first inclined portion 7 in the tire circumferential direction.

An angle θ1 of the groove center line of the first inclined portion 7 relative to the tire circumferential direction is, for example, 20 to 40°. The first inclined portion 7 having such a structure contributes to well-balanced enhancement of wet performance and steering stability.

A length L5 of the edge of the second inclined portion 8 in the tire circumferential direction is, for example, not less than four times the length L2 of the edge of the first inclined portion 7 in the tire circumferential direction, and is preferably 10 to 15 times the length L2.

An angle θ2 of the groove center line of the second inclined portion 8 relative to the tire circumferential direction is preferably less than the angle θ1 of the first inclined portion 7. The angle θ2 of the second inclined portion 8 is greater than 0°, and is, for example, 3 to 10°. The second inclined portion 8 having such a structure contributes to maintaining drainage performance of the circumferential groove 3.

Figure 4:
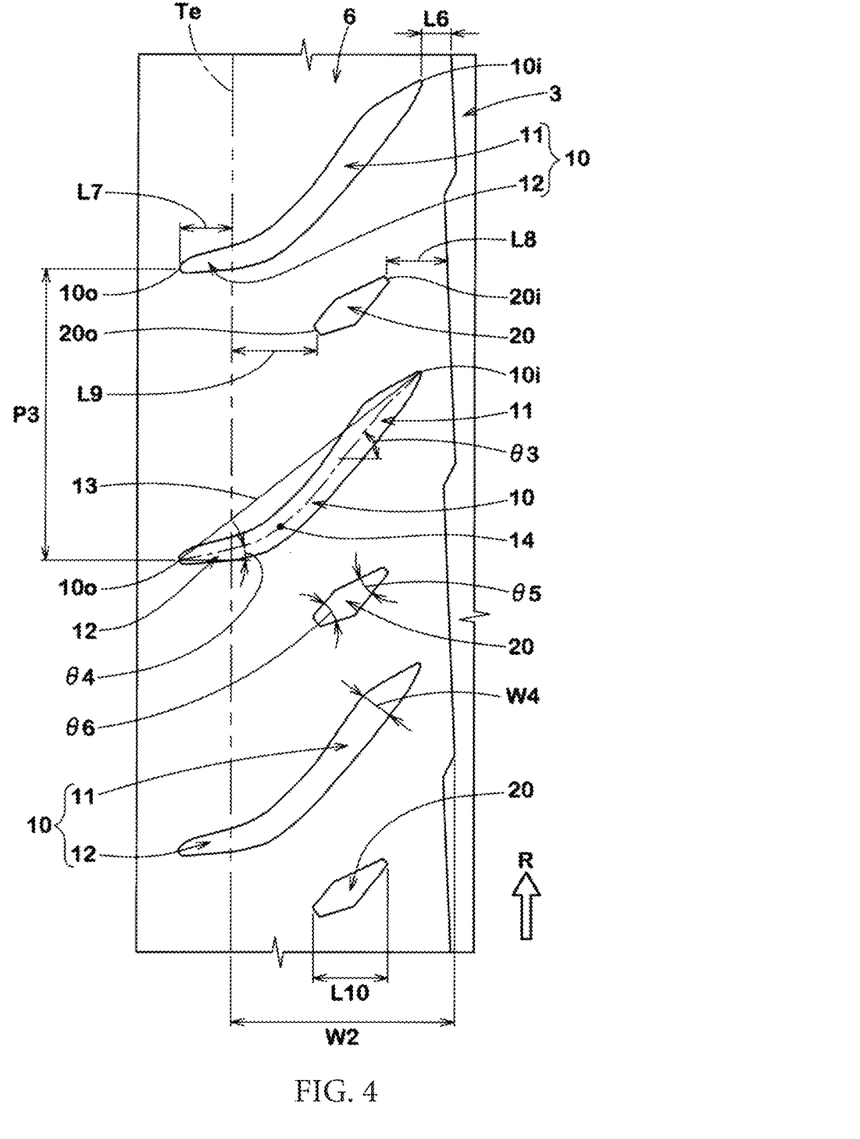
FIG. 4 is an enlarged view of a shoulder land portion shown in FIG. 1.

FIG. 4 is an enlarged view of the shoulder land portion 6. As shown in FIG. 4, the main inclined groove 10 extends, for example, across the center position of the tread surface of the shoulder land portion 6 in the tire axial direction. A distance L6 in the tire axial direction from the inner end 10*i* of the main inclined groove 10 to the circumferential groove 3 is, for example, 10% to 20% of the width W2 of the shoulder land portion 6 in the tire axial direction. The distance L6 is, for example, preferably less than the groove width W3 (shown in FIG. 2, similar in the following description) of the circumferential groove 3. The distance L6 is preferably greater than the zigzag amplitude A1 (shown in FIG. 2) of the groove center line of the circumferential groove 3 in the tire axial direction.

A distance L7 in the tire axial direction from the outer end 10*o* of the main inclined groove 10 to the tread contact end Te is, for example, 15% to 30% of the width W2 of the shoulder land portion 6 in the tire axial direction. In a preferable manner, in the present embodiment, the distance L7 is greater than the distance L6. Thus, water in the main inclined groove 10 is easily guided toward the tread contact end Te during running on a wet road surface.

The main inclined groove 10 of the present embodiment is inclined in the same direction as the first inclined portion 7 (shown in FIG. 2, similar in the following description) of the circumferential groove 3. The main inclined groove 10 having such a structure guides water in the groove toward the tread contact end Te in conjunction with the first inclined portion 7 during running on a wet road surface.

In the main inclined groove 10, for example, the groove center line is smoothly curved. In the main inclined groove 10 of the present embodiment, the groove center line is curved so as to project toward the heel side in the tire rotational direction R. The main inclined groove 10 includes a steeply inclined portion 11 on the inner end 10*i* side and a gently inclined portion 12 on the outer end 10*o* side.

For example, the steeply inclined portion 11 is inclined relative to the tire axial direction at an angle greater than that of a reference line 13 that is a straight line connecting between the inner end 10*i* and the outer end 10*o* of the main inclined groove 10. An angle θ3 of the steeply inclined portion 11 relative to the tire axial direction is, for example, 40 to 60°. The steeply inclined portion 11 having such a structure can quickly guide water therein toward the tread contact end Te during running on a wet road surface.

In a more preferable manner, a difference between the angle θ3 of the steeply inclined portion 11 relative to the tire axial direction and an angle of the first inclined portion 7 of the circumferential groove 3 relative to the tire axial direction is not greater than 30°. Thus, the steeply inclined portion 11 and the first inclined portion 7 exhibit excellent drainage performance in conjunction with each other.

The steeply inclined portion 11, this example, preferably overlaps a region obtained by extending the first inclined portion 7 of the circumferential groove 3 adjacent thereto along the tire axial direction.

The length of the steeply inclined portion 11 is, for example, less than one pitch length P3 with which the main inclined grooves 10 are aligned in the tire circumferential direction. The length of the steeply inclined portion 11 is preferably 70% to 85% of the one pitch length P3. The length of the steeply inclined portion 11 is a periphery length of the groove center line from the inner end 10*i* of the main inclined groove 10 to a boundary 14 between the steeply inclined portion 11 and the gently inclined portion 12. The boundary 14 corresponds to a point, on the groove center line, through which the tangent line parallel to the reference line 13 passes.

The gently inclined portion 12 is inclined relative to the tire axial direction at an angle less than the angle of the reference line 13. The angle θ4 of the gently inclined portion 12 is less than the angle θ3 of the steeply inclined portion 11 relative to the tire axial direction. The angle θ4 of the gently inclined portion 12 is, for example, 5 to 15°. The gently inclined portion 12 having such a structure can enhance drainage performance of the main inclined groove 10 and maintain wear resistance near the tread contact end Te.

In the present embodiment, the gently inclined portion 12 extends across the tread contact end Te. The length of the gently inclined portion 12 is, for example, less than the length of the steeply inclined portion 11. The length of the gently inclined portion 12 is preferably 25% to 40% of the one pitch length P3. The length of the gently inclined portion 12 is a periphery length of the groove center line from the outer end 10*o* of the main inclined groove 10 to the boundary 14.

In the present embodiment, a portion, of the main inclined groove 10, having a greatest groove width W4 is formed in the steeply inclined portion 11. The groove width W4 is, for example, 70% to 85% of the groove width W3 of the circumferential groove 3. The main inclined groove 10 having such a structure contributes to well-balanced enhancement of wet performance and steering stability.

The subsidiary inclined groove 20 is disposed between the two main inclined grooves 10 adjacent to each other in the tire circumferential direction. In the present embodiment, the main inclined grooves 10 and the subsidiary inclined grooves 20 alternate in the tire circumferential direction. In a preferable manner, only one subsidiary inclined groove 20 is disposed as a groove between the two main inclined grooves 10 adjacent to each other in the tire circumferential direction. In a more preferable manner, in the present embodiment, only one subsidiary inclined groove 20 is disposed between the two main inclined grooves 10 adjacent to each other in the tire circumferential direction, and any recessed element such as a groove, a sipe, and a recess other than the one subsidiary inclined groove 20 is not disposed therebetween.

The inner end 20*i* of the subsidiary inclined groove 20 is, for example, disposed outwardly of the inner end 10*i* of the main inclined groove 10 in the tire axial direction. Thus, the entirety of the subsidiary inclined groove 20 overlaps a region obtained by extending the steeply inclined portion 11 of the main inclined groove 10 along the tire circumferential direction. The subsidiary inclined groove 20 having such a structure contributes to enhancement of wear resistance near the circumferential groove 3.

In a more preferable manner, the subsidiary inclined groove 20 does not overlap a region obtained by extending the first inclined portion 7 along the tire axial direction. Thus, wear resistance of the shoulder land portion 6 is enhanced.

A distance L8 in the tire axial direction from the inner end 20*i* of the subsidiary inclined groove 20 to the circumferential groove 3 is, for example, 20% to 35% of the width W2 of the shoulder land portion 6 in the tire axial direction. A distance L9 in the tire axial direction from the outer end 20*o* of the subsidiary inclined groove 20 to the tread contact end Te is preferably greater than the distance L8, and is, for example, 30% to 45% of the width W2 of the shoulder land portion 6 in the tire axial direction. A length L10 of the subsidiary inclined groove 20 in the tire axial direction is, for example, 25% to 35% of the width W2 of the shoulder land portion 6. The subsidiary inclined groove 20 having such a structure inhibits a water film from being formed between a road surface and the center portion of the shoulder land portion 6 in the tire axial direction, during running on a wet road surface.

The subsidiary inclined groove 20 is, for example, preferably inclined in the same direction as the main inclined groove 10. An angle of the groove center line of the subsidiary inclined groove 20 relative to the tire axial direction is, for example, 30 to 50°. In a more preferable manner, an angle between the groove center line of the subsidiary inclined groove 20 and the groove center line of the second inclined portion 8 of the circumferential groove 3 is 40 to 60°.

The subsidiary inclined groove 20 has, for example, a groove width gradually increased outwardly from the inner end 20i in the tire axial direction. The subsidiary inclined groove 20 has a groove width gradually reduced from a portion having the greatest groove width toward the outer end 20o. An angle θ5 between the two edges at the inner end 20i of the subsidiary inclined groove 20 is, for example, 20 to 30°. An angle θ6 between the two edges at the outer end 20o of the subsidiary inclined groove 20 is preferably greater than the angle θ5, and is, for example, 30 to 40°. The subsidiary inclined groove 20 having such a structure easily guides water therein toward the tread contact end Te during running on a wet road surface, and exhibits excellent drainage performance.

As shown in FIG. 1, the crown land portion 5 preferably has no grooves and no sipes. However, the present disclosure is not limited thereto.

Figure 5:
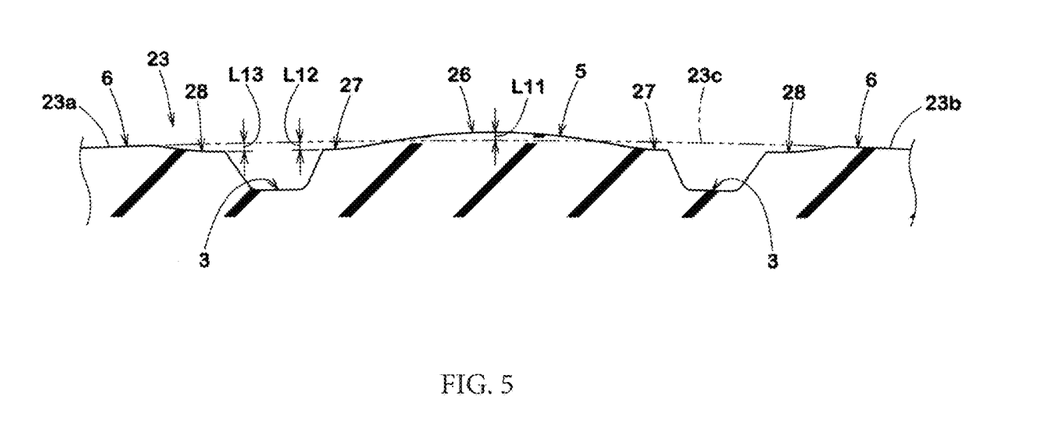
FIG. 5 is an enlarged cross-sectional view of a crown land portion and the shoulder land portion shown in FIG. 1.

FIG. 5 is an enlarged cross-sectional view of the crown land portion 5 and the shoulder land portions 6. In FIG. 5, the feature of the structure of each component is emphasized for easy understanding, and the proportion of dimensions between the components in FIG. 5 are different from actual proportions. As shown in FIG. 5, on the tire meridian cross-section, the two shoulder land portions 6 each form a part of an arc-shaped imaginary tread profile 23 extending from one of the tread contact ends Te to the other of the tread contact ends Te.

The imaginary tread profile 23 has, for example, a first profile 23a including one of the tread contact ends Te, a second profile 23b including the other of the tread contact ends Te, and a third profile 23c between the first profile 23a and the second profile 23b. The first profile 23a and the second profile 23b each correspond to a profile of the tread surface including the tread contact end Te in the shoulder land portion 6, and have a single curvature radius. The third profile 23c smoothly connects to the first profile 23a and the second profile 23b, and has the same curvature radius as that of the first profile 23a and the second profile 23b or a curvature radius greater than that of the first profile 23a and the second profile 23b.

The crown land portion 5 includes a first portion 26 projecting outwardly of the imaginary tread profile 23 in the tire radial direction. In the crown land portion 5 having such a structure, water is pushed away by the first portion 26 toward the circumferential grooves 3 during running on a wet road surface, thereby effectively inhibiting a hydroplaning phenomenon.

The crown land portion 5 includes second portions 27 recessed inwardly of the imaginary tread profile 23 in the tire radial direction. Thus, a contact pressure on the zigzag edge of the circumferential groove 3 is reduced to enhance wear resistance.

A projecting distance L11 of the first portion 26 is, for example, 0.3% to 1.0% of the width W1 (shown in FIG. 1, similar in the following description) of the crown land portion 5. A recessed distance L12 of the second portion 27 is, for example, 0.2% to 0.6% of the width W1 of the crown land portion 5. In a more preferable manner, the projecting distance L11 of the first portion 26 is greater than the recessed distance L12 of the second portion 27. The crown land portion 5 having such a structure enhances wet performance and wear resistance in a well-balanced manner.

In the present embodiment, the profile of the tread surface of the crown land portion 5 is curved outwardly in the tire radial direction into a projecting arc shape. However, the present disclosure is not limited thereto. For example, the profile of the tread surface of the crown land portion 5 may project outwardly in the tire radial direction by means of two straight lines inclined in opposite directions. For example, the crown land portion 5 having such a structure can more effectively inhibit a hydroplaning phenomenon during running on a circuit.

Each shoulder land portion 6 has a recess 28 recessed inwardly of the imaginary tread profile 23 in the tire radial direction. The recess 28 connects to a groove wall of the circumferential groove 3. A recessed distance L13 of the recess 28 of the shoulder land portion 6 is, for example, 0.2% to 0.6% of the width W1 of the crown land portion 5. Thus, the edge of the circumferential groove 3 on the shoulder land portion 6 side is inhibited from being worn.

Figure 6:
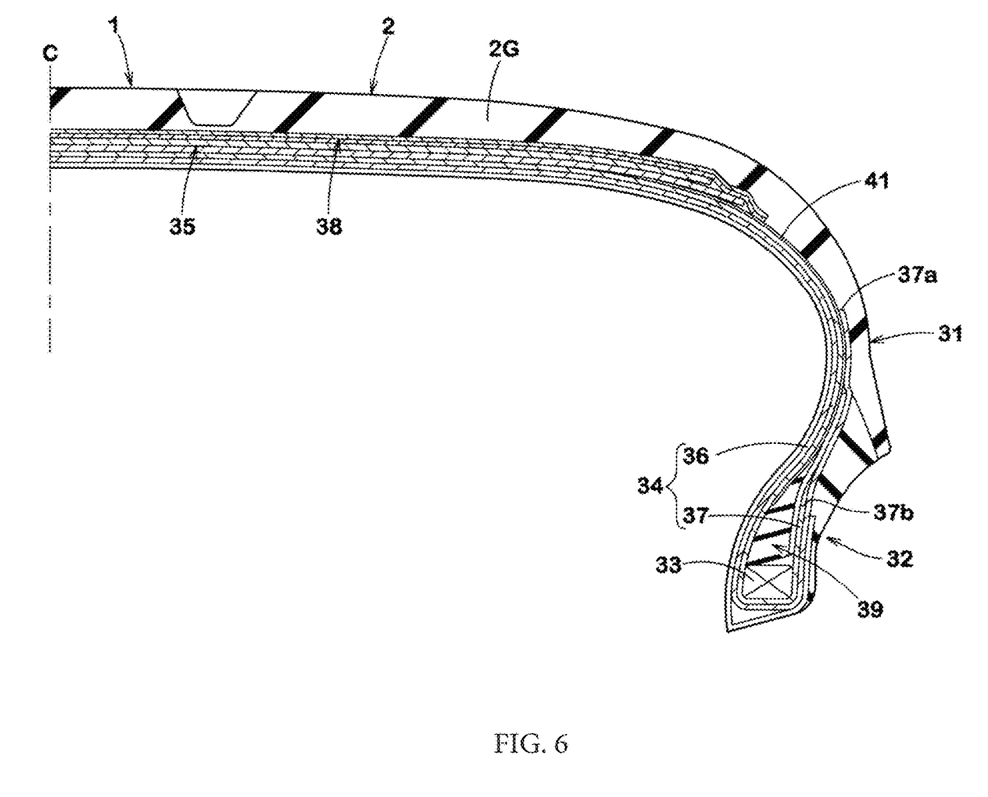
FIG. 6 is a meridian cross-sectional view of the tire according to the present embodiment.

FIG. 6 shows a meridian cross-section of the tire 1 according to the present embodiment. FIG. 6 shows one side lateral to the tire equator C in the tire axial direction, and does not show the other side lateral to the tire equator C in the tire axial direction. As shown in FIG. 6, the tire 1 includes a carcass 34 extending from the tread portion 2 through sidewall portions 31 to bead cores 33 of bead portions 32, and a tread reinforcing cord layer 35 disposed in the tread portion 2.

The carcass 34 is formed of two carcass plies in each of which a carcass cord such as an organic fiber cord is arranged at an angle of, for example, 70 to 90° relative to the tire circumferential direction. An angle of the carcass cord relative to the tire circumferential direction is preferably not less than 72° and more preferably not less than 74°, and preferably not greater than 84° and more preferably not greater than 80°. Thus, the sidewall portions 31 have enhanced stiffness by a binding effect, and vertical stiffness and lateral stiffness are enhanced, thereby allowing excellent steering stability to be exhibited particularly on a circuit. In the tire that includes the carcass 34 having such a structure, an internal pressure can be reduced by about 20 to 40 kPa as compared with a conventional tire, so that a contact area of the tread portion 2 is expected to be increased and excellent grip performance can be exhibited.

The carcass 34 has a body portion 36 extended on and between the two bead cores 33, and turned-up portions 37 that are turned up at the bead cores 33. In the present embodiment, an end 37a of one of the carcass plies serves as the outer end of the turned-up portion 37 in the tire radial direction, and an end 37b of the other of the carcass plies is disposed inwardly of the end 37a in the tire radial direction.

The tread reinforcing cord layer 35 includes, for example, a band layer 38 formed of two band plies. The band ply includes a band cord wound at an angle of not greater than 5° relative to the tire circumferential direction. The tread reinforcing cord layer 35 having such a structure contributes to enhancement of stiffness of the tread portion 2 in the tire circumferential direction.

In the present embodiment, insulation rubber 41 preferably extends along the body portion 36 of the carcass 34. The insulation rubber 41 extends, for example, from the end portion of the tread portion 2 in the tire axial direction through the sidewall portion 31 to the bead portion 32. In the present embodiment, the insulation rubber 41 extends to a portion near the center portion of bead apex rubber 39 in the tire radial direction. The insulation rubber 41 is disposed between the body portion 36 and the tread reinforcing cord layer 35 at the end portion of the tread portion 2. The insulation rubber 41 includes a portion between the body portion 36 and the turned-up portion 37 and a portion between the body portion 36 and the bead apex rubber 39 at the sidewall portion 31 or the bead portion 32. The insulation rubber 41 having such a structure allows enhancement of stiffness of the sidewall portion 31, and allows enhancement of steering stability particularly on a circuit.

The insulation rubber 41 has a thickness of, for example, 0.5 to 1.0 mm. The insulation rubber 41 preferably has, for example, a complex elastic modulus higher than that of rubber forming an outer surface of the sidewall portion 31. The complex elastic modulus is measured in compliance with the standard of JIS-K6394, by using, for example, a viscoelasticity spectrometer manufactured by Iwamoto Seisakusho, under conditions that a temperature is 70° C., a frequency is 10 Hz, an initial tensile strain is 10%, and an amplitude of dynamic strain is ±1%.

Figure 7:
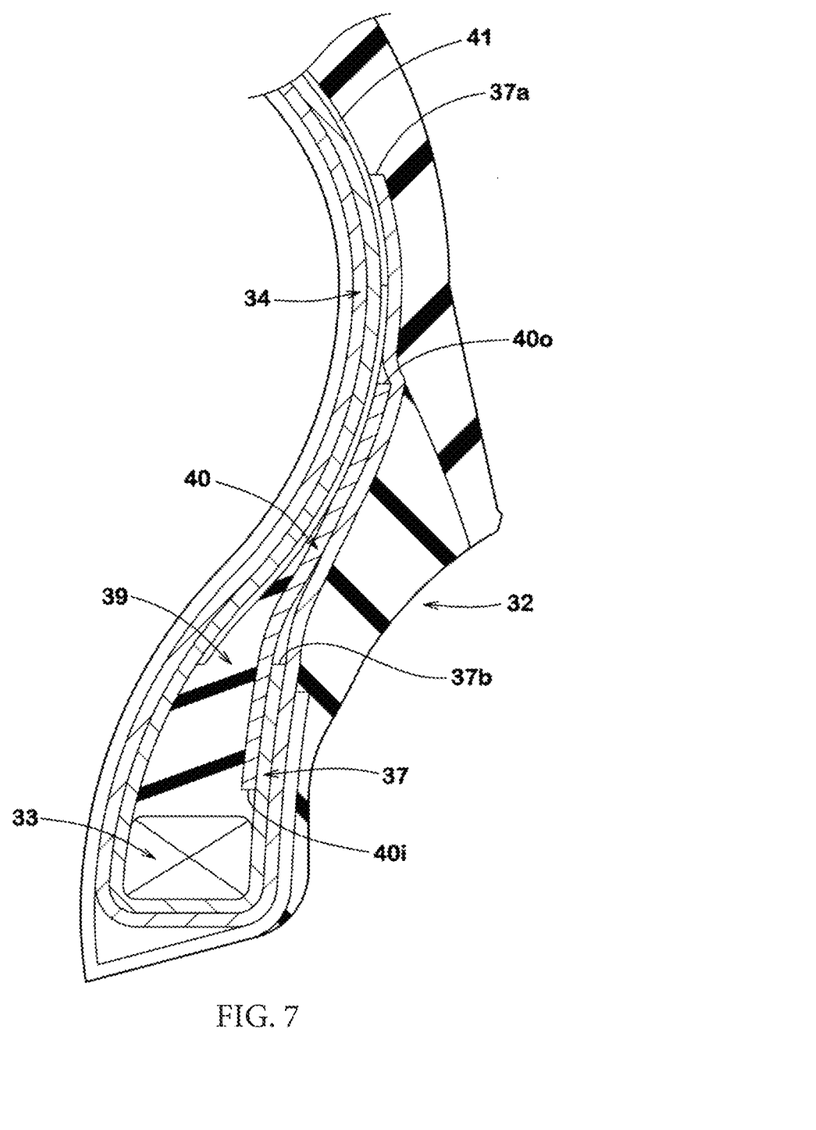
FIG. 7 is an enlarged view of a bead portion shown in FIG. 6.

FIG. 7 is an enlarged view of the bead portion 32. As shown in FIG. 7, in the present embodiment, the bead portion 32 has a bead reinforcing cord layer 40. In the present embodiment, the bead reinforcing cord layer 40 is disposed, for example, between the bead apex rubber 39 and the turned-up portion 37 of the carcass 34. The bead reinforcing cord layer 40 preferably includes, for example, a plurality of steel cords.

An outer end 40o of the bead reinforcing cord layer 40 in the tire radial direction is disposed tire-radially inward of the end 37a, of one of the carcass plies, which forms the outer end of the turned-up portion 37 in the tire radial direction. The outer end 40o of the bead reinforcing cord layer 40 in the tire radial direction is disposed tire-radially outwardly of the end 37b of the other of the carcass plies. The bead reinforcing cord layer 40 having such a structure can effectively reinforce the bead portion 32.

An inner end 40i of the bead reinforcing cord layer 40 in the tire radial direction is disposed tire-radially outwardly of the bead core 33. In a preferable manner, the inner end 40i of the bead reinforcing cord layer 40 is separated from the bead core 33. The bead reinforcing cord layer 40 having such a structure can appropriately reduce lateral stiffness of the bead portion 32 and allow response to become linear during steering.

As shown in FIG. 6, tread rubber 2G of the tread portion 2 preferably contains 40 to 60 parts by weight of styrene butadiene rubber per 100 parts by weight of raw material rubber. The tread rubber 2G preferably contains 20 to 30 parts by weight of carbon black per 100 parts by weight of the raw material rubber. The tread rubber 2G preferably contains 10 to 15 parts by weight of silica per 100 parts by weight of the raw material rubber. The tread rubber 2G having such a structure allows excellent steering stability and wear resistance to be exhibited particularly on a circuit.

Although the tire according to one embodiment of the present disclosure has been described above in detail, the present disclosure is not limited to the above-described specific embodiment, and various modifications can be made to implement the present disclosure.

EXAMPLES

A sample of a pneumatic tire having the basic pattern shown in FIG. 1 and a size of 275/35R18 was produced. As a comparative example, a sample of a tire in which circumferential grooves linearly extended was produced. Except for this structure, the tire of the comparative example had substantially the same pattern as shown in FIG. 1. Each test tire was tested for wet performance, steering stability, and wear resistance. The specifications common to the test tires and the test method are as follows.

Rim on which each tire was mounted: 18×9.5 J
Tire internal pressure: 180 kPa
Test vehicle: rear-wheel-drive car having an engine displacement of 3700 cc
Positions at which the tires were mounted: all wheels
<Wet Performance>
When a driver was driving the above-described test vehicle on a circuit track having a wet road surface, sensory evaluation was made by the driver for wet performance. The result was obtained as a score with the score of the comparative example being 100. The greater the value is, the more excellent the wet performance is.
<Steering Stability>
When a driver was driving the above-described test vehicle on a circuit track having a dry road surface, sensory evaluation was made by the driver for steering stability. The result was obtained as a score with the score of the comparative example being 100. The greater the value is, the more excellent the steering stability is.
<Wear Resistance>
After the above-described test vehicle ran over a certain distance, the remaining depth of the circumferential groove was measured. The result was indicated as an index with the remaining depth of the circumferential groove of the comparative example being 100. The greater the value is, the more excellent the wear resistance is.

The test results are indicated in Table 1.

TABLE 11

|  | Comp. Ex. | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Shape of circumferential groove | straight line | zigzag | zigzag | zigzag | zigzag | zigzag | zigzag | zigzag | zigzag | zigzag |
| Angle θ1 (°) of first inclined portion | — | 30 | 20 | 25 | 35 | 40 | 30 | 30 | 30 | 30 |

TABLE 11-continued

|  | Comp. Ex. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Angle θ2 (°) of second inclined portion | — | 5 | 3 | 5 | 7 | 10 | 5 | 5 | 5 | 5 |
| Projecting distance L11 of first portion/width W1 of crown land portion (%) | 0 | 0.6 | 0.6 | 0.6 | 0.6 | 0.6 | 0.2 | 0.3 | 1.0 | 1.2 |
| Recessed distance L12 of second portion/width W1 of crown land portion (%) | 0 | 0.5 | 0.5 | 0.5 | 0.5 | 0.5 | 0.1 | 0.2 | 0.6 | 0.7 |
| Wet performance (score) | 100 | 102 | 102 | 102 | 101 | 100 | 100 | 101 | 102 | 103 |
| Steering stability (score) | 100 | 105 | 103 | 105 | 105 | 106 | 106 | 106 | 104 | 103 |
| Wear resistance (index) | 100 | 100 | 100 | 100 | 100 | 99 | 98 | 99 | 101 | 101 |

According to the test results, it was confirmed that the tires of the examples allowed excellent steering stability to be exhibited while maintaining wet performance. Furthermore, it was confirmed that the tires of the examples also maintained wear resistance.

In view of the above, aspects of the embodiments include a variety of features, such as those described below.

In the tire according to the present disclosure, a zigzag amplitude of a groove center line of each circumferential groove is preferably less than a groove width of the circumferential groove.

In the tire according to the present disclosure, each circumferential groove preferably has a first inclined portion and a second inclined portion, and the second inclined portion is longer than the first inclined portion and is inclined in a direction opposite to a direction of the first inclined portion.

In the tire according to the present disclosure, each circumferential groove preferably has a first inclined portion and a second inclined portion, and the second inclined portion is longer than the first inclined portion and is inclined in a direction opposite to a direction of the first inclined portion. The main inclined grooves are preferably inclined in a same direction as the first inclined portion.

In the tire according to the present disclosure, the inner ends of the subsidiary inclined grooves are preferably disposed outwardly of the inner ends of the main inclined grooves in the tire axial direction.

In the tire according to the present disclosure, only one of the subsidiary inclined grooves is preferably disposed as a groove between the main inclined grooves adjacent to each other in the tire circumferential direction.

In the tire according to the present disclosure, each main inclined groove preferably includes a steeply inclined portion on the inner end side, and a gently inclined portion on the outer end side, and an angle of the gently inclined portion relative to the tire axial direction is preferably less than an angle of the steeply inclined portion relative to the tire axial direction.

In the tire according to the present disclosure, a width of each shoulder land portion in the tire axial direction is preferably 1.3 to 1.9 times a width of the crown land portion in the tire axial direction.

In the tire according to the present disclosure, on a tire meridian cross-section, each of the two shoulder land portions preferably forms a part of an arc-shaped imaginary tread profile extending from one of the tread contact ends to the other of the tread contact ends, and the crown land portion preferably includes a first portion projecting outwardly of the imaginary tread profile in a tire radial direction.

In the tire according to the present disclosure, the crown land portion preferably includes a second portion recessed inwardly of the imaginary tread profile in the tire radial direction.

In the tire according to the present disclosure, a projecting distance of the first portion is preferably greater than a recessed distance of the second portion.

The tire according to the present disclosure preferably includes a carcass extending from the tread portion through sidewall portions to bead cores of bead portions, and the carcass preferably includes a plurality of carcass cords arranged at an angle of 72 to 84° relative to the tire circumferential direction.

The tire according to the present disclosure preferably includes a carcass extending from the tread portion through sidewall portions to bead cores of bead portions, and bead reinforcing cord layers disposed at the bead portions, and the carcass preferably includes turned-up portions, and the turned-up portions are turned up at the bead cores. An outer end of each bead reinforcing cord layer in a tire radial direction is preferably disposed tire-radially inward of an outer end of a corresponding one of the turned-up portions in the tire radial direction.

In the tire according to the present disclosure, an inner end of each bead reinforcing cord layer in the tire radial direction is preferably disposed outwardly of a corresponding one of the bead cores in the tire radial direction.

In the tire according to the present disclosure, each of the bead reinforcing cord layers preferably includes a plurality of steel cords.

In the tire according to the present disclosure, the tread portion preferably has a tread reinforcing cord layer disposed thereinside. The tread reinforcing cord layer preferably includes a band layer formed of two band plies. The band plies preferably include band cords wound at an angle of not greater than 5° relative to the tire circumferential direction.

In the tire according to the present disclosure, the tread portion has two circumferential grooves continuously extending in the tire circumferential direction on both sides lateral to the tire equator so as to zigzag, and three land portions demarcated by the two circumferential grooves. The two circumferential grooves exhibit excellent drainage performance near the tire equator. The zigzag circumferential grooves have edges that allow traction to be enhanced during straight running.

The three land portions include a crown land portion disposed on the tire equator and two shoulder land portions including tread contact ends. At least one of the shoulder land portions includes a plurality of main inclined grooves and a plurality of subsidiary inclined grooves each extending so as to be inclined relative to the tire axial direction.

Each main inclined groove has a tire-axially inner end ending in the shoulder land portion, and a tire-axially outer end disposed outwardly of the tread contact end in the tire axial direction. The main inclined groove having the inner end maintains stiffness near the circumferential groove and enhances steering stability. The main inclined groove can guide water therein outwardly of the tread contact end during running on a wet road surface and contributes to enhancement of wet performance.

Each subsidiary inclined groove has a tire-axially inner end and a tire-axially outer end each ending in the shoulder land portion. The subsidiary inclined groove having such a structure can help the main inclined groove in enhancing drainage performance while maintaining stiffness of the shoulder land portion.

What is claimed is:

1. A tire comprising a tread portion,
   wherein the tread portion comprises two circumferential grooves continuously extending in, and zigzag along, a tire circumferential direction on both sides lateral to a tire equator, and three land portions demarcated by the two circumferential grooves,
   wherein the three land portions comprise a crown land portion disposed on the tire equator, and two shoulder land portions including tread contact ends,
   wherein at least one of the shoulder land portions comprises a plurality of main inclined grooves extending at one or more inclines relative to a tire axial direction, and a plurality of subsidiary inclined grooves extending at one or more inclines relative to the tire axial direction,
   wherein the main inclined grooves have tire-axially inner ends ending in the shoulder land portions and tire-axially outer ends disposed outwardly of the tread contact ends in the tire axial direction,
   wherein the subsidiary inclined grooves have tire-axially inner ends ending in the shoulder land portions and tire-axially outer ends ending in the shoulder land portions, and
   wherein, on a tire meridian cross-section,
      each of the two shoulder land portions forms a part of an arc-shaped imaginary tread profile extending from one of the tread contact ends to the other of the tread contact ends, and
      the crown land portion comprises a first portion projecting outwardly of the imaginary tread profile in a tire radial direction.

2. The tire according to claim 1, wherein a zigzag amplitude of a groove center line of each circumferential groove is less than a groove width of the circumferential groove.

3. The tire according to claim 1, wherein each circumferential groove has a first inclined portion and a second inclined portion, and the second inclined portion is longer than the first inclined portion and is inclined in a direction opposite to a direction of the first inclined portion.

4. The tire according to claim 1,
   wherein each circumferential groove has a first inclined portion and a second inclined portion, and the second inclined portion is longer than the first inclined portion and is inclined in a direction opposite to a direction of the first inclined portion, and
   wherein the main inclined grooves are inclined in a same direction as the first inclined portion.

5. The tire according to claim 1, wherein the inner ends of the subsidiary inclined grooves are disposed outwardly of the inner ends of the main inclined grooves in the tire axial direction.

6. The tire according to claim 1, wherein only one of the subsidiary inclined grooves is disposed as a groove between the main inclined grooves adjacent to each other in the tire circumferential direction.

7. The tire according to claim 1,
   wherein each main inclined groove comprises a steeply inclined portion on the inner end side, and a gently inclined portion on the outer end side, and
   wherein an angle of the gently inclined portion relative to the tire axial direction is less than an angle of the steeply inclined portion relative to the tire axial direction.

8. The tire according to claim 1, wherein a width of each shoulder land portion in the tire axial direction is 1.3 to 1.9 times a width of the crown land portion in the tire axial direction.

9. The tire according to claim 1, wherein the crown land portion comprises a second portion recessed inwardly of the imaginary tread profile in the tire radial direction.

10. The tire according to claim 9, wherein a projecting distance of the first portion is greater than a recessed distance of the second portion.

11. The tire according to claim 1, comprising a carcass extending from the tread portion through sidewall portions to bead cores of bead portions,
    wherein the carcass comprises a plurality of carcass cords arranged at an angle of 72 to 84° relative to the tire circumferential direction.

12. The tire according to claim 1, comprising:
    a carcass extending from the tread portion through sidewall portions to bead cores of bead portions, and
    bead reinforcing cord layers disposed at the bead portions,
    wherein the carcass comprises turned-up portions, and the turned-up portions are turned up at the bead cores, and
    wherein an outer end of each bead reinforcing cord layer in the tire radial direction is disposed tire-radially inward of an outer end of a corresponding one of the turned-up portions in the tire radial direction.

13. The tire according to claim 12, wherein an inner end of each bead reinforcing cord layer in the tire radial direction is disposed outwardly of a corresponding one of the bead cores in the tire radial direction.

14. The tire according to claim 12, wherein each of the bead reinforcing cord layers comprises a plurality of steel cords.

15. The tire according to claim 1,
wherein the tread portion has a tread reinforcing cord layer disposed thereinside,
wherein the tread reinforcing cord layer comprises a band layer formed of two band plies, and
wherein the band plies comprise band cords wound at an angle of not greater than 5° relative to the tire circumferential direction.

16. The tire according to claim 1, wherein the subsidiary inclined groove does not overlap a region obtained by extending a first inclined portion along the tire axial direction.

17. A tire comprising a tread portion,
wherein the tread portion comprises two circumferential grooves continuously extending in, and zigzag along, a tire circumferential direction on both sides lateral to a tire equator, and three land portions demarcated by the two circumferential grooves,
wherein the three land portions comprise a crown land portion disposed on the tire equator, and two shoulder land portions including tread contact ends,
wherein at least one of the shoulder land portions comprises a plurality of main inclined grooves extending at one or more inclines relative to a tire axial direction, and a plurality of subsidiary inclined grooves extending at one or more inclines relative to the tire axial direction,
wherein the main inclined grooves have tire-axially inner ends ending in the shoulder land portions and tire-axially outer ends disposed outwardly of the tread contact ends in the tire axial direction,
wherein the subsidiary inclined grooves have tire-axially inner ends ending in the shoulder land portions and tire-axially outer ends ending in the shoulder land portions, and
wherein a steeply inclined portion overlaps a region obtained by extending a first inclined portion of the circumferential groove adjacent thereto along the tire axial direction.

18. A tire comprising a tread portion,
wherein the tread portion comprises two circumferential grooves continuously extending in, and zigzag along, a tire circumferential direction on both sides lateral to a tire equator, and three land portions demarcated by the two circumferential grooves,
wherein the three land portions comprise a crown land portion disposed on the tire equator, and two shoulder land portions including tread contact ends,
wherein at least one of the shoulder land portions comprises a plurality of main inclined grooves extending at one or more inclines relative to a tire axial direction, and a plurality of subsidiary inclined grooves extending at one or more inclines relative to the tire axial direction,
wherein the main inclined grooves have tire-axially inner ends ending in the shoulder land portions and tire-axially outer ends disposed outwardly of the tread contact ends in the tire axial direction,
wherein the subsidiary inclined grooves have tire-axially inner ends ending in the shoulder land portions and tire-axially outer ends ending in the shoulder land portions, and
wherein insulation rubber extends along a body portion of the carcass.

19. The tire according to claim 18, wherein the insulation rubber extends from an end portion of the tread portion in the tire axial direction through a sidewall portion to a bead portion.

* * * * *